United States Patent
Torii et al.

[11] Patent Number: 5,444,612
[45] Date of Patent: Aug. 22, 1995

[54] ADAPTIVE PI CONTROL SYSTEM

[75] Inventors: Nobutoshi Torii, Hachioji; Ryo Nihei; Tetsuaki Kato, both of Yamanishi, all of Japan

[73] Assignee: Fanuc Ltd., Yamanashi, Japan

[21] Appl. No.: 368,711

[22] Filed: Jan. 3, 1995

Related U.S. Application Data

[63] Continuation of Ser. No. 960,441, Dec. 10, 1992, abandoned.

[30] Foreign Application Priority Data

Apr. 16, 1991 [JP] Japan ............................. 3-110989

[51] Int. Cl.⁶ .................. G05B 13/04; G05B 11/42; G06F 19/00
[52] U.S. Cl. ........................... 364/161; 318/561; 364/149; 364/176
[58] Field of Search .................. 364/148, 149–151, 364/152–157, 160–163, 164, 165, 176, 177, 183; 318/561, 609, 610

[56] References Cited

U.S. PATENT DOCUMENTS

| | | | |
|---|---|---|---|
| 3,571,578 | 3/1971 | Fry | 364/157 |
| 4,195,337 | 3/1980 | Bertrand et al. | 364/163 X |
| 4,742,285 | 5/1988 | Sasaki et al. | 318/632 |
| 4,797,835 | 1/1989 | Kurami et al. | 364/149 X |
| 4,912,753 | 3/1990 | Evans, Jr. | 364/167.01 X |
| 4,998,051 | 3/1991 | Ito | 364/165 X |
| 5,091,843 | 2/1992 | Peczkowski | 364/164 X |
| 5,311,421 | 5/1994 | Nomura et al. | 364/157 |

FOREIGN PATENT DOCUMENTS

| | | |
|---|---|---|
| 0121310 | 10/1984 | European Pat. Off. |
| 3708266 | 9/1987 | Germany |
| 59-030104 | 2/1984 | Japan |
| 62-113205 | 5/1987 | Japan |
| 1-314306 | 12/1989 | Japan |
| 3-063704 | 3/1991 | Japan |
| 3-078806 | 4/1991 | Japan |
| 3-082385 | 4/1991 | Japan |

*Primary Examiner*—Joseph Ruggiero
*Attorney, Agent, or Firm*—Staas & Halsey

[57] ABSTRACT

An adaptive proportional-plus-integral control system for controlling a robot or a machine tool which is subject to large load variation. The PI control system comprises a speed control loop and a pre-compensator provided in the speed control loop. The pre-compensator is equivalent to a system which is the combination of a reference model and an inverse system of a servomotor, and has adaptivity. Since the pre-compensator is incorporated into the speed control loop, robust control can be made even if the inertia of a load is largely variable.

6 Claims, 4 Drawing Sheets

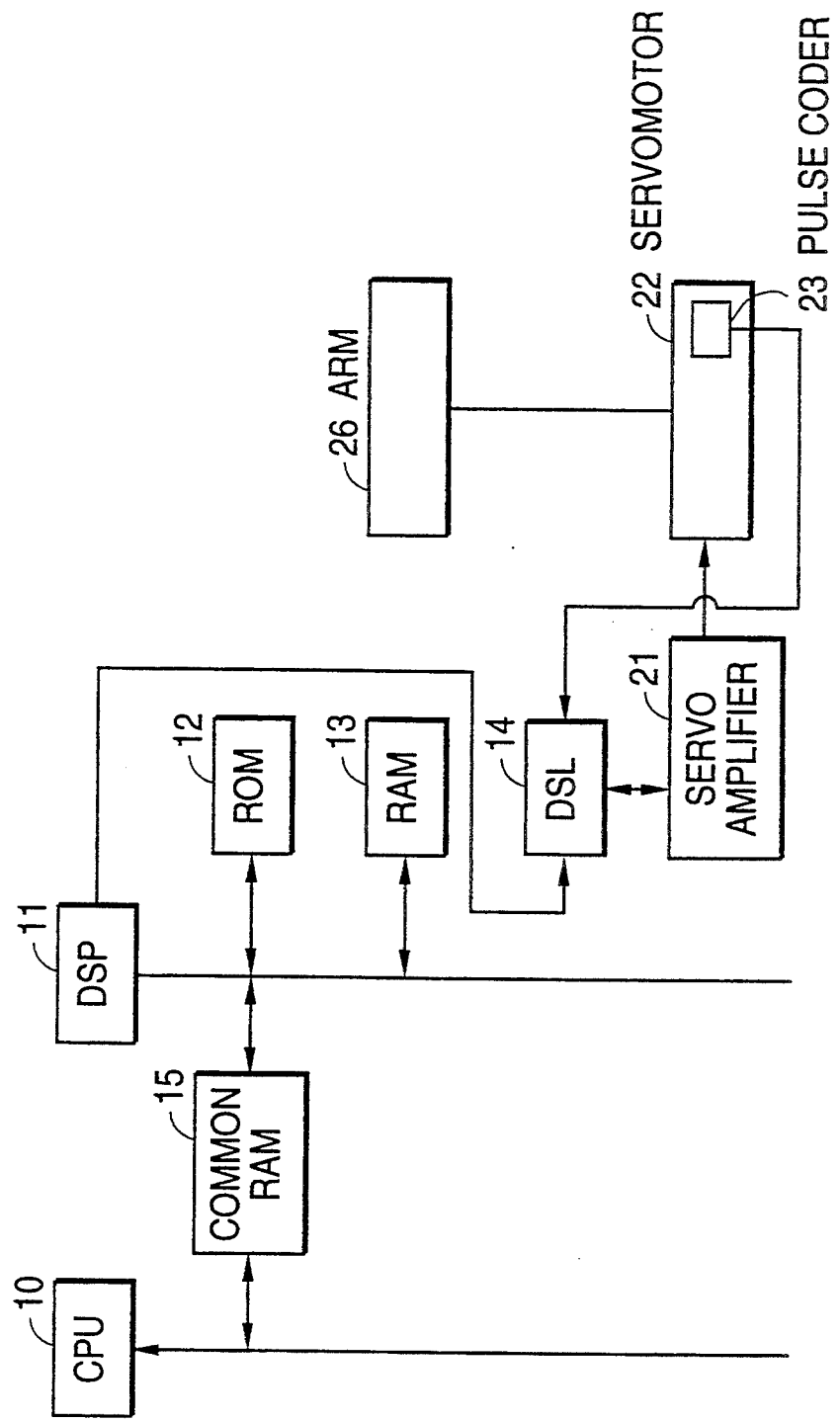

ADAPTIVE PI CONTROL SYSTEM

This application is a continuation of application number 07/960,441, filed Dec. 10, 1992, now abandoned.

BACKGROUND OF THE INVENTION

1. Field of the Invention

This invention relates to an adaptive proportional-plus-integral control system (adaptive PI control system) using adaptive control, and more particularly, to an adaptive PI control system for controlling a robot, a machine tool which is subject to large load variation or the like.

2. Description of the Related Art

Conventionally, in plants such as robots and the like, systems are generally controlled by a PI control loop having a fixed gain, and parameters of the systems are adjusted manually through trial and error.

For the PI control system such as those used in the robots and the like, it is important to have quick response and robustness for being capable of coping with the variation of the parameters such as the variation of the inertia.

When a servo system is constituted of a conventional PI control system, a large feedback gain will be needed for obtaining quick response of the system, since the control by such a conventional system is solely dependent on the feedback loop. If the feedback gain is too large, however, the stability of the servo system is lost and oscillation is liable to occur. Thus, in the case of a conventional system, the response can be enhanced only to a limited extent. To improve the response while at the same time maintaining the system stability, a control method using a feedforward loop may be employed; however, this method has a drawback such that the control operation is easily affected by a parameter variation in the controlled system due to the absence of the feedback from the controlled system.

Even in the case of a controlled system in which the quick response is not so important, parameter adjustment of the feedback loop so time-consuming that the actual application of this method is very difficult due to the difficulty of setting the parameters to optimum values.

SUMMARY OF THE INVENTION

This invention was contrived in view of the above circumstances, and an object thereof is to provide an adaptive PI control system including a servo system having desired response.

According to this invention, there is provided an adaptive PI control system for carrying out PI control of a servomotor, characterized in that a pre-compensator equivalent to a system which is a combination of a reference model and an inverse system of the servomotor and having adaptivity is provided in a speed control loop.

The pre-compensator is composed of the reference model and the inverse system of the servomotor. Thus, in the speed control loop, the servomotor and the inverse system countervail each other, and the loop is equivalent to a single system of the reference model. Namely, an ideal system can be formed by designing a desired reference model.

Further, since the pre-compensator has adaptivity, the gain is automatically adjusted, thus requiring no manual gain adjustment. Furthermore, an I-type servo system including an integrator (I) in its loop is formulated, unlike conventional adaptive control systems, and therefore, steady-state deviation can be eliminated.

BRIEF DESCRIPTION OF THE DRAWINGS

FIG. 2 is a composition diagram showing by way of example the hardware of a robot system for carrying out this invention;

DETAILED DESCRIPTION OF THE PREFERRED EMBODIMENTS

Figure 1:
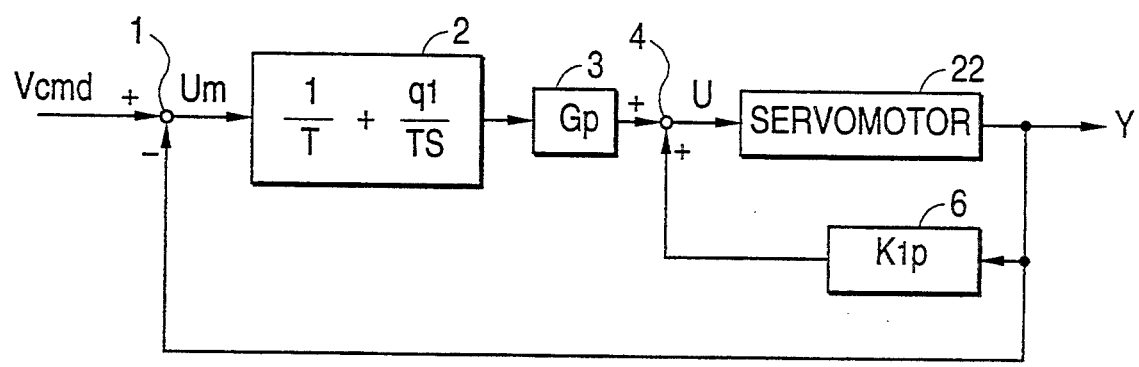
FIG. 1 is a block diagram of a speed control loop to which a control law and adaptivity law according to this invention are applied.

Referring first to FIG. 2, the hardware of a robot system according to one embodiment of this invention will be described. In FIG. 2, a host processor (CPU) 10 globally controls the robot, and a robot position command from the host processor 10 is written in a common RAM 15. Elements connected to the host processor 10, such as a ROM and a RAM, are omitted in the figure.

A DSP (digital signal processor) 11 reads out the position command from the common RAM 15 at regular intervals of time in accordance with a system program stored in a ROM 12. Based on the position command and a position feedback from a pulse coder 23 built in a servomotor 22, the DSP 11 obtains a position deviation, a speed and a speed deviation, and supplies a current command based on these values to a servo amplifier 21 via a DSL (digital servo LSI) 14 to thereby drive the servomotor 22. A robot arm 26 is actuated by the servomotor 22. More particularly, the DSP 11 controls three loops of the servomotor 22, i.e., position loop, speed loop, and current loop.

The DSP 11 also estimates a parameter of the speed control loop on the basis of a torque command (current command) U or a speed Y, etc., as described later, and accomplishes, by means of software, the function of a pre-compensator having a reference model and an inverse model of the servomotor 22.

The pre-compensator will be described with reference to FIG. 3.

The pre-compensator 31 has an integral gain $K_1$ and a proportional gain $K_2$. An element 32 representing the transfer function of the servomotor 22 has a torque constant $K_t$, inertia J, and dynamical friction coefficient A. In this system, it is assumed that, when the element 32 is given the torque command U, it outputs the speed Y.

Figure 3:
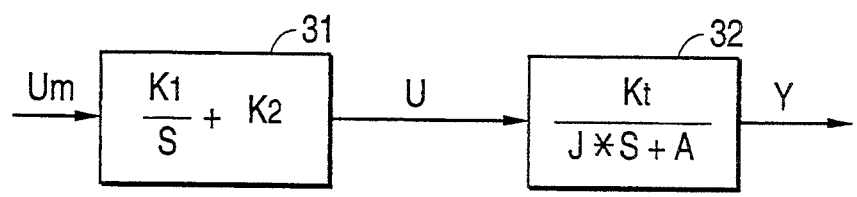
FIG. 3 is a diagram illustrating a pre-compensator and a servomotor.

Provided that the system of FIG. 3 has an ideal gain having a rise time of T (second), then $$K_1 = A/(K_t * T)$$

and $K_2 = J/(K_t * T)$

These equations are obtained by solving the equation $$(V_{cmd} - Y)*[(K_1/S) + K_2]*[K_t/(J*S+A)] = Y \quad (5)$$

which represents a servo system comprising the system of FIG. 3 plus speed feedback, i.e., a system for inputting a speed deviation $U_m$, obtained by subtracting the speed feedback Y from the speed command $V_{cmd}$, to the precompensator 31, with the equation $$Y/V_{cmd} = 1/(T*S+1)$$

being substituted in the above equation.

Substituting $K_1$ and $K_2$ for the element 31 of FIG. 3 provides $$(K_1/S) + K_2 = [1/(T*S)]*[(J*S+A)/K_t]$$

Figure 4:
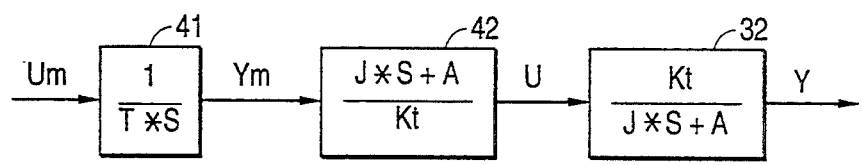
FIG. 4 is a diagram showing the system of FIG. 3 in terms of a reference model etc.

Accordingly, the system of FIG. 3 can be expressed as shown in FIG. 4, i.e., as a series connection including an element 41, an element 42, and the element 32 representing the transfer function of the servomotor.

Figure 5:
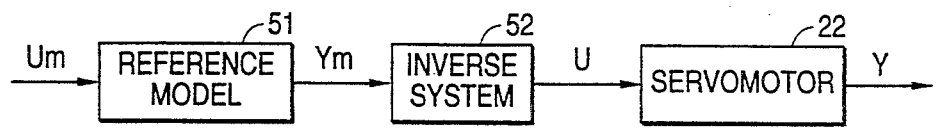
FIG. 5 is a diagram showing the system of FIG. 4 in terms of the reference model and an inverse system.

Furthermore, the system of FIG. 4 can be regarded as a system composed of a reference model 51, an inverse system 52 of the servomotor and the servomotor 22, as shown in FIG. 5.

That is, a pre-compensator equivalent to the combination of the reference model 51 and the inverse system 52 of the servomotor, shown in FIG. 5, needs to be constituted. The following is a detailed description of how the pre-compensator is constituted.

A controlled system to which adaptive control is applied is the servomotor 22, and the transfer function thereof is expressed as $$K_t/(J*S+A)$$

Here, if the reference model is defined as $$1/(T*S)$$

then the state equation of the controlled system is expressed as $$(dX_1/dt) = [-A/J]*X_1 + [K_t/J]*U \quad (1a)$$

and $$Y = [1]*X_1 \quad (1b)$$

Similarly, the state equation of the reference model is expressed as $$(dX_{1m}/dt) = [0]*X_{1m} + [1/T]*U_m \quad (2a)$$

and $$Y_m = [1]*X_{1m} \quad (2b)$$

Next, the inverse system of the servomotor 22, particularly the inverse system based on state feedback, is formulated. Differentiating both sides of equation (1b) and substituting equation (1a) provides the following equation:

$$Y = X_1' = (-A/J)*X_1 + (K_t/J)*U \quad (3)$$

Given $q_1$ as a parameter, and calculating [equation (3) + equation (1b)*$q_1$], followed by rearrangement, provides $$U = -(J/K_t)*[(-A/J) + q_1]*X_1 + (J/K_t)*(S+q_1)*Y \quad (4)$$

Equation (4) represents the inverse system of the servomotor. This equation is combined with the reference model 51, then from equations (2a) and (2b), $$\begin{aligned} U &= -(J/K_t)*[(-A/J) + q_1]*X_1 + \\ &\quad (J/K_t)*(S + q_1)*[1/(T*S)]*U_m \\ &= -(J/K_t)*[(-A/J) + q_1]*X_1 + \\ &\quad (J/K_t)*[(1/T) + q_1*\{1/(T*S)\}]*U_m \end{aligned} \quad (5)$$

Then, equation (4) is rewritten as follows:

$$U = K_1*X_1 + G*(S+q_1)*Y \quad (6)$$

The values $K_1$ and G are given as $$K_1 = -(J/K_t)*[(-A/J) + q_1]$$

$$G = J/K_t$$

$K_1$ and G include the inertia J and torque constant $K_t$ which are parameters of the servomotor, and thus cannot be directly obtained. Accordingly, the parameters $K_1$ and G are derived through estimation.

Both sides of equation (6) are individually divided by $(S+q_1)$, then $$U/(S+q_1) = K_1*[X_1/(S+q_1)] + G*Y \quad (7)$$

Here, if V and $\zeta_1$ are defined as $$V = U/(S+q_1)$$

$$\zeta_1 = X_1/(S=q_1)$$

then, equation (7) can be expressed in the following simple form:

$$V = K_1*\zeta_1 + G*Y \quad (8)$$

The identified model of equation (8) is defined as $$V_p = K_{1p}*\zeta_1 + G_p*Y \quad (9)$$

where the terms followed by the subscript "p" denote estimated values of plant parameters, and the terms without the subscript "p" denote actual parameters of the plant. That is, equation (8) represents the actual plant (servomotor), and the terms followed by the subscript "p" in equation (9) represent the estimated values of the respective plant (servomotor) parameters. The parameters V, $V_p$, $\zeta_1$ and Y are measurable or computable.

Here, if the estimation error of the plant parameters is defined as $\epsilon$, then the following equation holds:

$$\begin{aligned} \epsilon &= V - V_p \\ &= (K_1 - K_{1p})*\zeta_1 + (G - G_p)*Y \end{aligned}$$

Further, where the Liapunov function is defined as $J_r$ equals $\epsilon^2$ (i.e., $J_r = \epsilon^2$), then $$\partial J_r/\partial K_{1p} = -2*\epsilon*\zeta_1$$

$$\partial J_r/\partial G_p = -2*\epsilon*Y$$

From this, the adaptivity law is determined as follows:

$$dK_{1p}/dt = \beta*\epsilon*\zeta_1$$

$$dG_p/dt = \beta*\epsilon*Y$$

(where $\beta$ is a positive constant).
This is because $dJ_r/dt$ can be expressed as $$\begin{aligned}dJ_r/dt &= (\partial J_r/\partial K_{1p})*(dK_{1p}/dt) + (\partial J_r/\partial G_p)*(dG_p/dt) \\ &= -2*\beta*\epsilon^2*(\zeta_1^2 + Y^2)\end{aligned}$$

$(\beta > 0)$ and thus always takes a negative value. That is, the above equation indicates a monotonic decrease of the system, and thus converges to a minimum value $$J_r = \epsilon = 0$$

Therefore, $$V = V_p$$

and the parameter converges to the true value.

Consequently, from equation (5), the control law can be expressed as follows:

$$U = K_{1p}*X_1 + G_p*[(1/T) + q_1*\{1/(T*S)\}]*U_m \quad (10)$$

The adaptivity law is given by the following equations:

$$dK_{1p}/dt = \beta*\epsilon*\zeta_1 \quad (11)$$

$$dG_p/dt = \beta*\epsilon*Y \quad (12)$$

$(\beta > 0)$
where V and $\zeta_1$ can be expressed as $$V = U/(S+q_1)$$

and $$\zeta_1 X_1/(S+q_1)$$

FIG. 1 is a block diagram of a servomotor speed control loop to which the above control law and adaptivity law are applied. The speed Y is subtracted from the speed command $V_{cmd}$ at an adder 1, the output of which, i.e., the speed deviation $U_m$, is supplied to an element 2. The element 2 is made up of the proportional gain term (1/T) and the term ($q_1$/TS) which is the product of the proportional coefficient term for integration and the integral gain term.

An element 3 is a term for the estimated value of the plant parameter $G_p$, and is obtained by integrating both sides of the aforementioned equation (12). Similarly, an element 6 is a term for the estimated value of the plant parameter $K_{1p}$, and is obtained by integrating both sides of equation (11).

A value obtained by multiplying the output of the element 2 by the estimated value of the plant parameter $G_p$ is added to the value obtained by multiplying the speed Y by the estimated value of the plant parameter $K_{1p}$, on an adder 4, to obtain a torque command U (the calculation of equation (10)), which is outputted to the servomotor 22. The parameter $V_p$ naturally converges to V. In this case, the elements 2, 3 and 6 and the adder 4 constitute the reference model 51 and inverse system 52 shown in FIG. 5.

Finally, equation (10) can be modified according to PI control, with $X_1$ rewritten as $(1/T*S)*U_m$ (i.e., $X_1 = (1/T*S)*U_m$), as follows:

$$\begin{aligned}U &= K_{1p}*X_1 + G_p*[(1/T) + q_1*\{1/(T*S)\}]*U_m \\ &= K_{1p}*\{1/(T*S)\}*U_m + G_p*[(1/T) + q_1*\{1/(T*S)\}]*U_m \\ &= (K_{1p} + G_p*q_1)*\{1/(T*S)\}*U_m + G_p*(1/T)*U_m\end{aligned} \quad (13)$$

Figure 6:
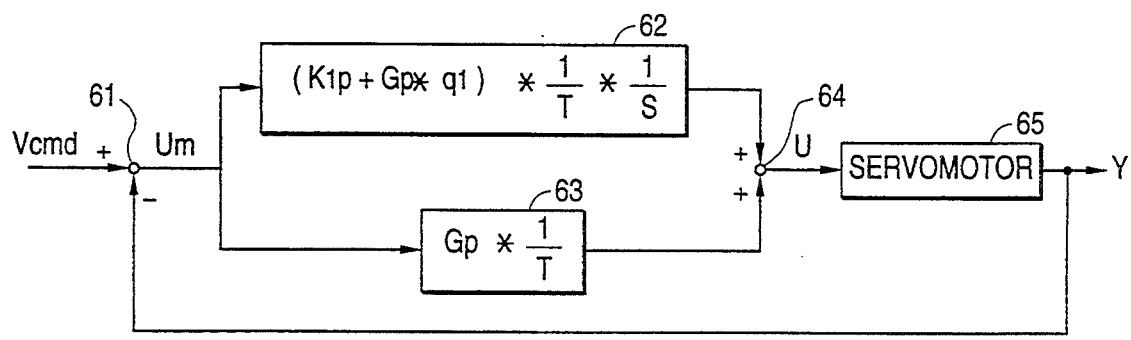
FIG. 6 is a block diagram of a speed control loop in which the speed control loop of FIG. 1 is applied to PI control.

FIG. 6 is a block diagram of a servomotor speed control loop for another PI control. Specifically, the block diagram corresponds to equation (13). The speed Y is subtracted from the speed command $V_{cmd}$ on an adder 61, the output of which is supplied to elements 62 and 63. The element 62 corresponds to the first term of equation (13), whereas the element 63 to the second term of equation (13). The results of the calculations at the elements 62 and 63 are added together on an adder 64 to obtain a torque command U, which is outputted to a servomotor 65. The parameter $V_p$ naturally converges to V. In this case, the elements 62 and 63 and the adder 64 constitute the reference model 51 and inverse system 52 shown in FIG. 5.

The circuit represented by block diagram of FIG. 6 does not include a positive feedback element corresponding to the element 6 in FIG. 1, and thus is capable of providing stabler control.

Figure 7:
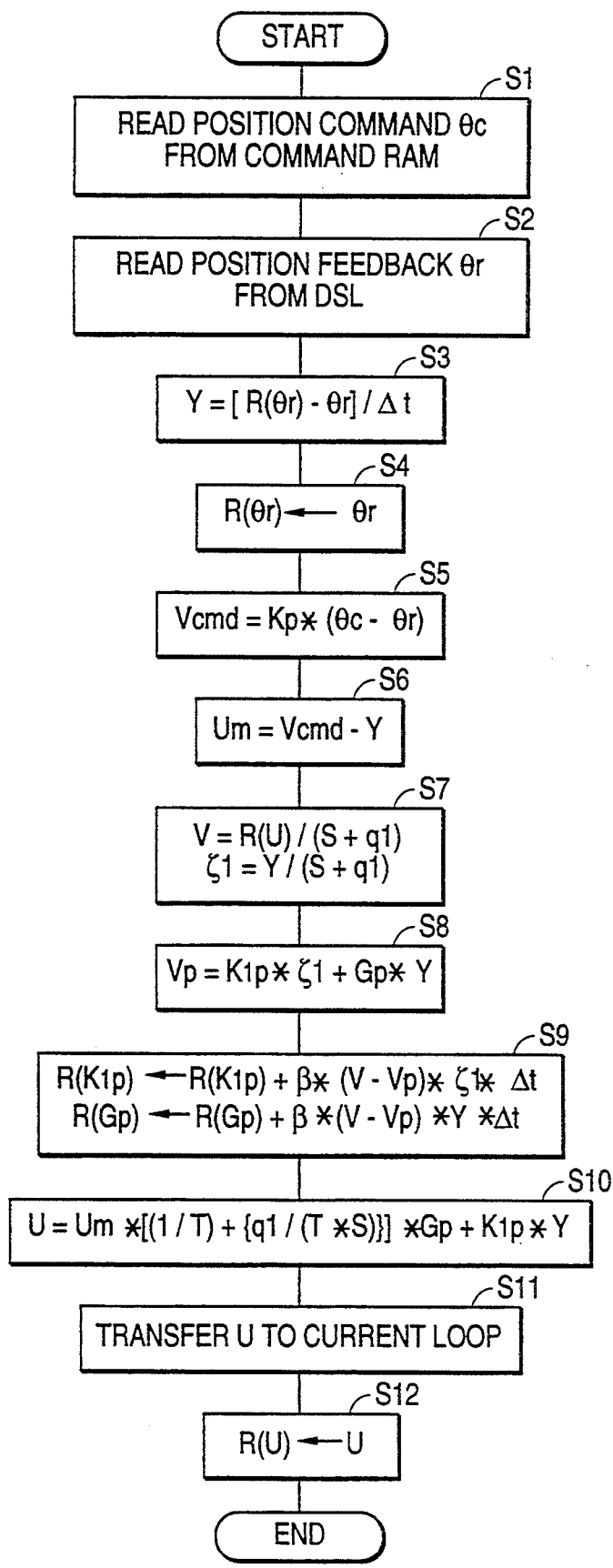
FIG. 7 is a flowchart of a process executed by a digital signal processor in the embodiment shown in FIG. 2.

The speed loop processing according to the embodiment of this invention, which is executed by the digital signal processor 11 shown in FIG. 2, will be now described with reference to the flowchart of FIG. 7. The parameter $q_1$, the rise time T, and the positive constant $\beta$ are preset in a control unit. Upon start, the digital signal processor 11 executes the process shown in FIG. 7 at predetermined intervals of $\Delta t$.

First, in Step S1, a position command $\theta c$ is read from the common RAM 15, and, in Step S2, a position feedback $\theta r$ is read out through the DSL 14. Then, in Step S3, the difference between this position feedback $\theta r$ and a position feedback $\theta r$ which is stored in a register $R(\theta r)$ in the preceding cycle is divided by $\Delta t$ to obtain a current speed Y. The value of the position feedback $\theta r$ is stored in the register $R(\theta r)$ in Step 4 in order to be used in the subsequent cycle. Then, in Step S5, a position deviation $(\theta c - \theta r)$ is multiplied by the position loop gain $K_p$ to obtain a speed command $V_{cmd}$, and, in Step S6, the speed Y is subtracted from the speed command $V_{cmd}$ to obtain a speed deviation $U_m$.

In Step S7, a torque command U, which is obtained in the preceding cycle and stored in a register R(U), and the speed Y obtained in Step S3, are subjected to a filtering processing of $1/(S+q_1)$, and the values V and $\zeta_1$ are obtained as follows:

$$V = U/(S+q_1)$$

$$\zeta_1 = Y/(S+q_1)$$

Subsequently, in Step S8, the calculation of equation (9) is carried out using $\zeta_1$ and speed Y, obtained in Step S7, and estimated values $K_{1p}$ and $G_p$ of the plant parameters $K_{1p}$ and $G_p$, calculated in the preceding cycle and stored in registers $R(K_{1p})$ and $R(G_p)$ respectively, to obtain $V_p$.

In Step S9, the values $K_{1p}$ and $G_p$ are estimated. That is, from the aforementioned equations (11) and (12), $$\Delta K_{1p}/\Delta t = \beta^*(V - V_p)^*\zeta_1$$

$$\Delta G_p \Delta t = \beta^*(V - V_p)^* Y$$

therefore, $$\Delta K_{1p} = \beta^*(V - V_p)^*\zeta_1 {}^* \Delta t$$

$$\Delta G_p = \beta^*(V - V_p)^* Y^* \Delta t$$

These values $K_{1p}$ and $G_p$ are added respectively to the values $K_{1p}$ and $G_p$ obtained in the preceding cycle and stored in the registers $R(K_{1p})$ and $R(G_p)$. In other words, the integrating processing represented by equations (11) and (12) is carried out to obtain estimated values of the plant parameters $K_{1p}$ and $G_p$.

Then, in Step S10, based on thus obtained $U_m$, $G_p$, $K_{1p}$ and Y, the calculation of equation (10), that is, $$U = U_m^*[(1/T) + \{q_1/(T^*S)\}]^* G_p + K_{1p}^* Y$$

is carried out to obtain a torque command U, and the obtained U is then transferred to the current loop in Step S11. Finally, the value of the torque command U is stored in the register R(U) to be used in the subsequent cycle, Step S12.

Thus, by incorporating the pre-compensator including the reference model and the inverse system of the servomotor into the adaptive PI control system, the robust PI control can be made available even when the load such as a robot inertia is largely variable.

In the above description, a servomotor for driving a robot is exemplified as a plant, but this invention is also applicable, e.g., to a speed control loop of a numerical control device for controlling a machine tool which is subject to large load variation.

Further, in the foregoing embodiment, the controlled system is a first-order lag system, but similar effects can be obtained even when the inverse system is adapted to a controlled system of second or more order lag.

As described above, according to this invention, the reference model and inverse system having adaptivity are provided in the speed control loop of the servomotor, and thus optimum control can be achieved even if the inertia of a load is variable. Further, since the gain is automatically determined, the gain adjustment work is unnecessary.

Furthermore, an integrator (I) is included in the loop, unlike conventional adaptive control systems, so that the control system can be made available as an I-type servo system, and the steady-state deviation can be eliminated.

We claim:

1. An adaptive PI control system for executing proportional and integral control of a servomotor in feedback speed control loop using a speed feedback signal from the servomotor, comprising:
   a pre-compensator device, provided in said feedback speed control loop and based on a reference model and an inverse system of the servomotor, to output torque command to the servomotor and to perform an adaptive control for automatically adjusting a feedback gain of said speed control loop, said pre-compensator device including:
   a first element which adds a proportional gain term and an integral gain term and outputs a first value;
   a second element which multiplies said first value by a first estimated plant parameter and outputs a second value;
   a third element which multiplies a speed of the servomotor by a second estimated plant parameter and outputs a third value; and
   an adder which adds said second and third values to thereby output said torque command to said servomotor.

2. An adaptive PI control system according to claim 1 wherein said pre-compensator device includes an identified model element which obtains a plant parameter based on a current input and speed of the servomotor to converge the plant parameter.

3. An adaptive PI control system according to claim 1, wherein said servomotor is a servomotor for a robot.

4. An adaptive PI control system for executing proportional and integral control of a servomotor in a feedback speed control loop using a speed feedback signal from the servomotor, comprising:
   a pre-compensator device, provided in said feedback speed control loop and based on a reference model and an inverse system of the servomotor, to output a torque command to the servomotor and to perform an adaptive control for automatically adjusting a feedback gain of said speed control loop, said precompensator device including:
   a first element which adds a first estimated plant parameter to a product of a second estimated plant parameter multiplied by a constant to produce a first value and which multiplies the first value by a proportional gain term and an integral term to produce a second value;
   a second element for multiplying said second estimated plant parameter by said proportional gain term to produce a third value; and
   an adder which adds said second and third values to thereby output said torque command to said servomotor.

5. An adaptive PI control system according to claim 4 wherein said pre-compensator device includes an identified model element which obtains a plant parameter based on a current input and speed of the servomotor to converge the plant parameter.

6. An adaptive PI control system according to claim 4 wherein said servomotor is a servomotor for a robot.

* * * * *

UNITED STATES PATENT AND TRADEMARK OFFICE
CERTIFICATE OF CORRECTION

PATENT NO. : 5,444,612
DATED : August 22, 1995
INVENTOR(S) : Torii et al.

It is certified that error appears in the above-indentified patent and that said Letters Patent is hereby corrected as shown below:

Col. 3, line 11, change "precompensator" to --pre-compensator--.
Col. 7, line 11, in the equation, before "$\Delta$" (second occurrence) insert --/--.
Col. 8, line 8, after "output" insert --a--;
        line 25, after "1" insert --,--;
        line 55, after "4" insert --,--;
        line 60, after "4" insert --,--.

Signed and Sealed this

Twentieth Day of February, 1996

Attest:

BRUCE LEHMAN

Attesting Officer     *Commissioner of Patents and Trademarks*